(12) United States Patent
Sugaya (10) Patent No.: US 8,874,962 B2
(45) Date of Patent: Oct. 28, 2014

(54) DIAGNOSTIC HANDLING SERVER USING DISSATISFYING ITEM DATA

(75) Inventor: Shunji Sugaya, Tokyo (JP)

(73) Assignee: OPTiM Corporation, Saga (JP)

( * ) Notice: Subject to any disclaimer, the term of this patent is extended or adjusted under 35 U.S.C. 154(b) by 184 days.

(21) Appl. No.: 13/347,281

(22) Filed: Jan. 10, 2012

(65) Prior Publication Data

US 2013/0151897 A1 Jun. 13, 2013

(30) Foreign Application Priority Data

Dec. 7, 2011 (JP) ................................. 2011-267703

(51) Int. Cl.
*G06F 11/00* (2006.01)
*G06F 11/30* (2006.01)

(52) U.S. Cl.
USPC ................ 714/26; 714/37; 702/185; 705/304

(58) Field of Classification Search
CPC ......................... G06F 11/0709; G06F 11/0763
USPC ............. 714/26, 37, 38.1; 702/183, 184, 185; 705/304, 305
See application file for complete search history.

(56) References Cited

U.S. PATENT DOCUMENTS

| | | | | |
|---|---|---|---|---|
| 6,836,750 B2 * | 12/2004 | Wong et al. | ................... | 702/186 |
| 6,854,069 B2 * | 2/2005 | Kampe et al. | ................. | 714/4.12 |
| 7,100,085 B2 * | 8/2006 | Miller | .............................. | 714/26 |
| 7,206,771 B2 * | 4/2007 | Alvarez et al. | .................. | 706/45 |
| 7,992,050 B2 * | 8/2011 | Melamed | ........................ | 714/45 |
| 8,069,374 B2 * | 11/2011 | Panigrahy et al. | ............ | 714/38.1 |
| 8,516,308 B1 * | 8/2013 | Gill et al. | ..................... | 714/38.1 |
| 2003/0145083 A1 * | 7/2003 | Cush et al. | ..................... | 709/224 |
| 2004/0153327 A1 * | 8/2004 | Liu et al. | ............................ | 705/1 |
| 2006/0020866 A1 * | 1/2006 | Lo et al. | ........................ | 714/741 |
| 2006/0080606 A1 * | 4/2006 | Lortscher et al. | ............. | 715/705 |
| 2006/0168165 A1 * | 7/2006 | Boss et al. | ..................... | 709/221 |
| 2007/0116185 A1 * | 5/2007 | Savoor et al. | ..................... | 379/9 |
| 2009/0138854 A1 * | 5/2009 | Mani | ............................. | 717/124 |
| 2013/0103973 A1 * | 4/2013 | Werth et al. | ....................... | 714/2 |

FOREIGN PATENT DOCUMENTS

| | | | |
|---|---|---|---|
| JP | 2005026856 A | 1/2005 |
| JP | 2005149301 A | 6/2005 |

OTHER PUBLICATIONS

Wikipedia's SQL version from Dec. 4, 2011 http://en.wikipedia.org/w/index.php?title=SQL&oldid=463947176.*
Remote Support Service, [online], Nippon Telegraph and Telephone East Corporation, retrieved from http://flets.com/osa/remote.

* cited by examiner

*Primary Examiner* — Joseph Schell
(74) *Attorney, Agent, or Firm* — BainwoodHuang (57) ABSTRACT

A diagnostic handling server is capable of supporting users without operator support, in which the proper handling of a problem, which users know through experience, can be reflected in the support. Preliminarily, data (e.g., dissatisfying item data) on the item with which a user feels dissatisfied and diagnostic data on the diagnoses of the electric appliances are collected from the electric appliances to be supported. The feature points of the respective electric appliances with which the user feels dissatisfied are then extracted from the collected diagnostic data. When the user feels dissatisfied with a specific electric appliance, the diagnostic data of the electric appliance is transmitted together with a search request for the proper handling, the transmitted diagnostic data is compared with the preliminarily extracted feature point, and information on the cause and the proper handling is provided to the user.

12 Claims, 8 Drawing Sheets

Fig.6  <DIAGNOSTIC DATA CORRESPONDENCE TABLE>

| MODEL NAME | SERIAL NUMBER | DISSATISFYING ITEM DATA | DIAGNOSTIC DATA | | | |
|---|---|---|---|---|---|---|
| | | | APPLICATION SETTING | POWER SAVING SETTING | BRIGHTNESS SETTING | |
| Smart-01 | 001 | DECREASED PROCESSING SPEED | APPLICATIONS A,B,C,D | ON | 4 | : |
| | 002 | DECREASED PROCESSING SPEED | APPLICATIONS A,B,E,F | OFF | 7 | : |
| | 003 | UNCLEAR DATA TRAFFIC SETTING | APPLICATIONS A,B,G,K | ON | 10 | : |
| Phone-S | 011 | QUICKLY DISCHARGED BATTERY | N/A | OFF | 4 | : |
| | 012 | QUICKLY DISCHARGED BATTERY | N/A | OFF | 7 | : |
| | 013 | QUICKLY DISCHARGED BATTERY | N/A | OFF | 10 | : |

Fig.7

<FEATURE POINT CORRESPONDENCE TABLE>

| MODEL NAME | DISSATISFYING ITEM DATA | DIAGNOSTIC DATA FEATURE POINT | DIAGNOSTIC HANDLING |
|---|---|---|---|
| Smart-01 | DECREASED PROCESSING SPEED | APPLICATION SETTING :A,B | Message01 |
| Phone-S | QUICKLY DISCHARGED BATTERY | POWER SAVING SETTING :OFF | Message02 |

Fig.8
< DATA TRANSMISSION OUTPUT SCREEN >

Please check items that you are not satisfied with.

- ☑ Processing speed is decreased.
- ☐ Rechargeable battery is quickly discharged.
- ☐ Touch operation is inconvenient.

Transmit — 90

Fig.9
< SEARCH REQUEST OUTPUT SCREEN >

Please check items that you are not satisfied with.

- ☑ Processing speed is decreased.
- ☐ Rechargeable battery is quickly discharged.
- ☐ Touch operation is inconvenient.

Search for the proper handling — 95

Fig.10
< DIAGNOSTIC HANDLING INFORMATION OUTPUT SCREEN >

【Processing speed is decreased】
The proper handling is as follows.

There is a report that CPU processing speed may be decreased due to the installed applications A and B.

It is recommended that either or both of the applications A and B be uninstalled in the following way.

Uninstall

DIAGNOSTIC HANDLING SERVER USING DISSATISFYING ITEM DATA

CROSS REFERENCE TO RELATED APPLICATIONS

This application is based on and claims the benefit of priority from Japanese Patent Application No. 2011-267703, filed on Dec. 7, 2011, the content and teachings of which are incorporated herein by reference.

TECHNICAL FIELD

The present invention relates to a diagnostic handling server, a diagnostic handling method, and a program for the same server to diagnose and handle an electric appliance.

BACKGROUND ART

It has been known that a remote support service for users who operate electric appliances such as a smart phone and a personal computer may be provided via a network using a public network. Such a remote support service allows customer support staff to access users' personal computers and electric appliances directly so as to diagnose and handle the situation or the problem with the personal computers and the electronic appliances.

For example, a method in which a user terminal is remotely accessed by a support-side computer, ensuring security without bothering with complex configuration (for example, see PLTs 1 and 2).

In the inventions described in PLTs 1 and 2, the operator's remote support for the software on the client side can be made through remote login. Furthermore, as shown in NPL 1, remote control combined with a telephone can provide instructions to a support target.

CITATION LIST

Patent Literature

PLT 1: Japanese Unexamined Patent Application 2005-026856
PLT 2: Japanese Unexamined Patent Application 2005-149301

Non Patent Literature

NPL 1: Remote Support Service, [online], NIPPON TELEGRAPH AND TELEPHONE EAST CORPORATION, [retrieved on Nov. 23, 2011], Retrieved from the Internet: <URL: http://flets.com/osa/remote/>

SUMMARY OF INVENTION

However, configuring an electric appliance with operator support through a telephone or the like every time requires a user's time and effort. Furthermore, the more electric appliances to be supported become widely used, the more the number of electric appliances to be supported increases. Accordingly, there is a problem in which the frequency of required support increases. Therefore, it is desired that users themselves can configure electric appliances without an operator's support.

In addition, various kinds of application software maybe provided by a number of suppliers, so that the companies supporting electric appliances cannot definitely identify the cause of problems. For example, a supplier may not yet admit that its specific application causes a problem but some users already know that this application causes a problem. In this case, the users may know through experience that this application only has to be uninstalled to solve the problem. It is desired that the proper handling of a problem, which users who use electric appliances know through experience, can be reflected in the support.

An objective of the present disclosure is to provide a diagnostic handling server, a diagnostic handling method, and a program for the same server, being capable of supporting users without operator support, in which the handling of a problem, which users know through experience, can be reflected in the support.

According to one embodiment, a diagnostic handling server communicatively connected with a plurality of electric appliances includes:

a first storage module configured to receive, from the plurality of electric appliances, diagnostic data on a diagnosis item predetermined for each of the electric appliances and dissatisfying item data on a user's dissatisfaction with that electric appliance, and to store the diagnostic data in relation to the dissatisfying item data;

a second storage module configured to extract common or similar dissatisfying item data from the dissatisfying item data received from the plurality of electric appliances, and extract and store a diagnostic data feature point corresponding to the extracted common or similar dissatisfying item data;

a receiving module configured to receive, from one electric appliance, a search request in relation to a specific dissatisfying item and diagnostic data of the one electric appliance;

a first extraction module configured to compare, in response to the search request, the dissatisfying item from the search request to the dissatisfying item data, and to extract the same or similar dissatisfying item data as or to the dissatisfying item from the search request;

a comparison module configured to read out the diagnostic data feature point corresponding to the extracted dissatisfying item data and to compare the diagnostic data feature point with the diagnostic data of the one electric appliance; and a second extraction module configured to extract diagnostic handling information for the one electric appliance based on a comparison result.

According to one embodiment, a diagnostic handling server communicatively connected with a plurality of electric appliances receives, from the plurality of electric appliances, diagnostic data on a diagnosis item predetermined for each of the electric appliances and dissatisfying item data on a user's dissatisfaction with the electric appliances, and stores the diagnostic data in relation to the dissatisfying item data. The diagnostic handling server then extracts common or similar dissatisfying item data from the dissatisfying item data received from the plurality of electric appliances, and extracts and stores the diagnostic data feature point corresponding to the extracted common or similar dissatisfying item data. The diagnostic handling server then receives, from one electric appliance, a search request in relation to a specific dissatisfying item and the diagnostic data of the one electric appliance, and compares, in response to the search request, the dissatisfying item from the search request to the dissatisfying item data, and extracts the same or similar dissatisfying item data as or to the dissatisfying item with the search request. The diagnostic handling server then reads out the diagnostic data feature point corresponding to the extracted dissatisfying item data and compares the diagnostic data feature point with the diagnostic data of the one electric appliance, and extracts diagnostic handling information for the one electric appliance based on a comparison result.

Accordingly, these embodiments provide a diagnostic handling server capable of supporting users without operator support, in which the correct handling of a problem, which users know through experience, can be reflected in the support.

According to one embodiment, in the diagnostic handling server, the diagnostic handling information is information on the cause and the handling of a dissatisfying item with a search request as a user is dissatisfied with the one electric appliance.

According to one embodiment, in the diagnostic handling server, the diagnostic handling information is a handling program in which one electric appliance handles itself, link information indicating a place where the handling program is stored, or a command to start a handling program preliminarily stored in the one electric appliance.

According to one embodiment, the diagnostic handling server further includes:

a third storage module configured to receive, from the plurality of electric appliances, model names of the respective electric appliances, and to store the module name in relation to the dissatisfying item data, in which (a) the diagnostic data feature point, are stored in relation to each of the respective model names, (b) from the one electric appliance, the model name of the one electric appliance is received in response to the search request, and (c) the second extraction module extracts the diagnostic handling information based on the model name in addition to a comparison result by the comparison module.

The present invention can provide a diagnostic handling server, a diagnostic handling method, and a program for the same server, being capable of supporting users without operator support, in which the handling way of a problem which users know through experience can be reflected in the support.

DESCRIPTION OF EMBODIMENTS

Hereinafter, embodiments of the present invention will be described with reference to the attached drawings. However, this is illustrative only, and the technological scope of the present invention is not limited thereto.

The present invention will be explained below. Preliminarily, data (dissatisfying item data) on the item with which a user feels dissatisfied and diagnostic data on the diagnoses of the electric appliances 10A and 10B are collected from the electric appliances 10A and 10B to be supported. The feature points of the respective electric appliances 10A and 10B with which the user feels dissatisfied are then extracted from the collected diagnostic data. When the user feels dissatisfied with a specific electric appliance 10, the diagnostic data of the electric appliance 10 is transmitted together with a search request for the proper handling, the transmitted diagnostic data is compared with the preliminarily extracted feature point, and information on the cause and the handling is provided to the user.

Summary of Diagnosis Handling System

Figure 1:
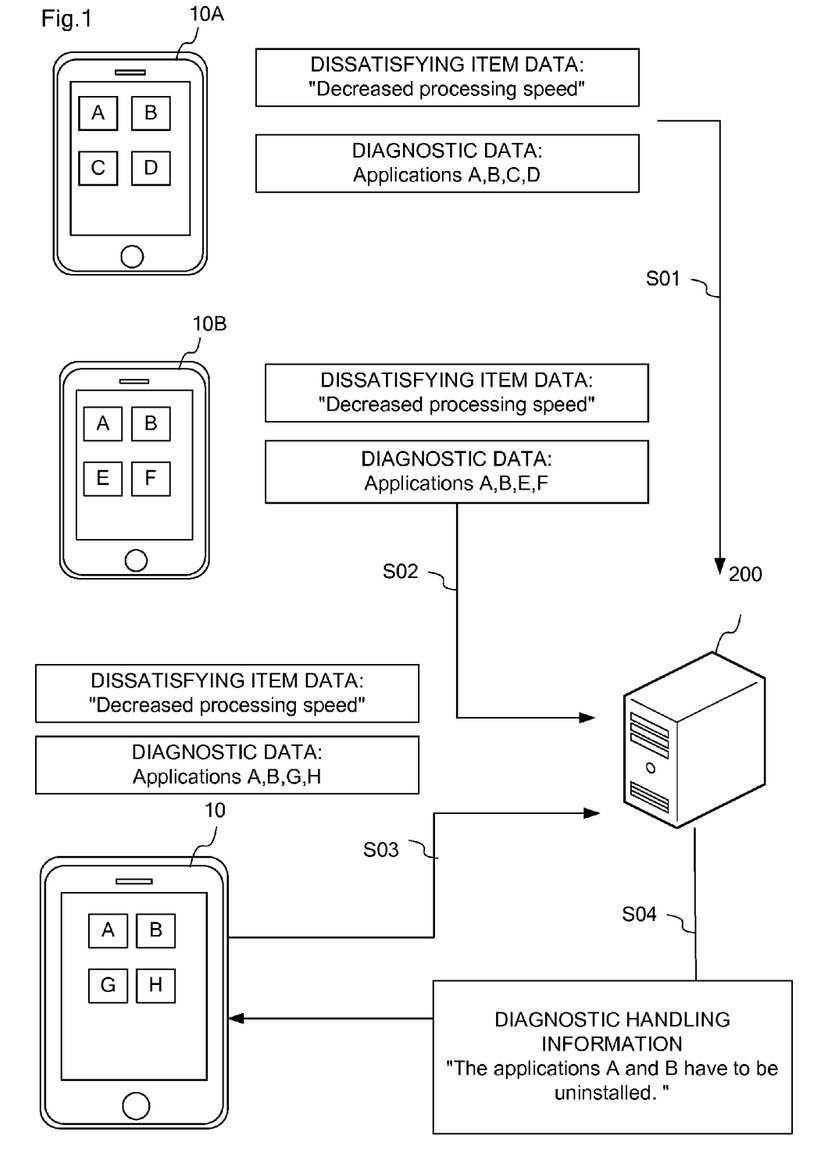
FIG. 1 is a schematic diagram illustrating an overview of an example diagnosis handling system.

An overview of the diagnosis handling system 1 according to one embodiment will be explained based on FIG. 1.

The electric appliance 10A first receives an input of the dissatisfying item data (for example, decreased processing speed) from a user and then transmits diagnostic data (for example, diagnostic content indicating that the applications A, B, C, and D are installed) and the dissatisfying item data to the diagnostic handling server 200 (Step S01).

Likewise, the electric appliance 10B first receives an input of the dissatisfying item data (for example, decreased processing speed) and then transmits diagnostic data (for example, diagnostic content indicating that the applications A, B, E, and F are installed) and the dissatisfying item data to the diagnostic handling server 200 (Step S02). The diagnostic handling server 200 may receive dissatisfying item data and diagnostic data from even more electric appliances 10 other than the electric appliances 10A and 10B shown in the drawings.

The diagnostic handling server 200 extracts common or similar dissatisfying item data from the dissatisfying item data received from these electric appliances 10A and 10B, and extracts and stores the diagnostic data feature point corresponding to the extracted common or similar dissatisfying item data. In this case, a plurality of received dissatisfying item data which are common in "decreased processing speed" are extracted. The feature points of the diagnostic data are the applications A, B, C, and D and the applications A, B, E, and F, respectively. Accordingly, the common feature point is that the applications A and B are installed.

When the user of a certain electric appliance 10 feels that this electric appliance 10 has a matter (e.g., dissatisfying item) required for diagnosis, the electric appliance 10 transmits the dissatisfying item data (e.g., decreased processing speed) and a search request for diagnostic handling through the electric appliance 10 (Step S03). The electric appliance 10 also transmits the diagnostic data (e.g., the applications A, B, G, and H are installed) of this electric appliance 10 to the diagnostic handling server 200.

In response to this, the diagnostic handling server 200 extracts the received dissatisfying item data and the same dissatisfying item data that is previously stored. In this case, the diagnostic handling server 200 extracts the dissatisfying item data (decreased processing speed), and compares the feature point (the installed applications A and B) of the diagnostic data corresponding to this dissatisfying item data (decreased processing speed) with the diagnostic data of the electric appliance 10 that has transmitted a search request.

Based on this comparison, the diagnostic handling server 200 determines that the applications A and B are also installed in the electric appliance 10 that has transmitted a search request and transmits the information "the applications A and B have to be uninstalled." to the electric appliance 10 as diagnostic handling information (Step S04). The electric appliance 10 then outputs this diagnostic handling information, so that the user who uses the electric appliance 10 can understand the correct handling of the dissatisfying item.

Configuration of Diagnostic Handling System

Figure 2:
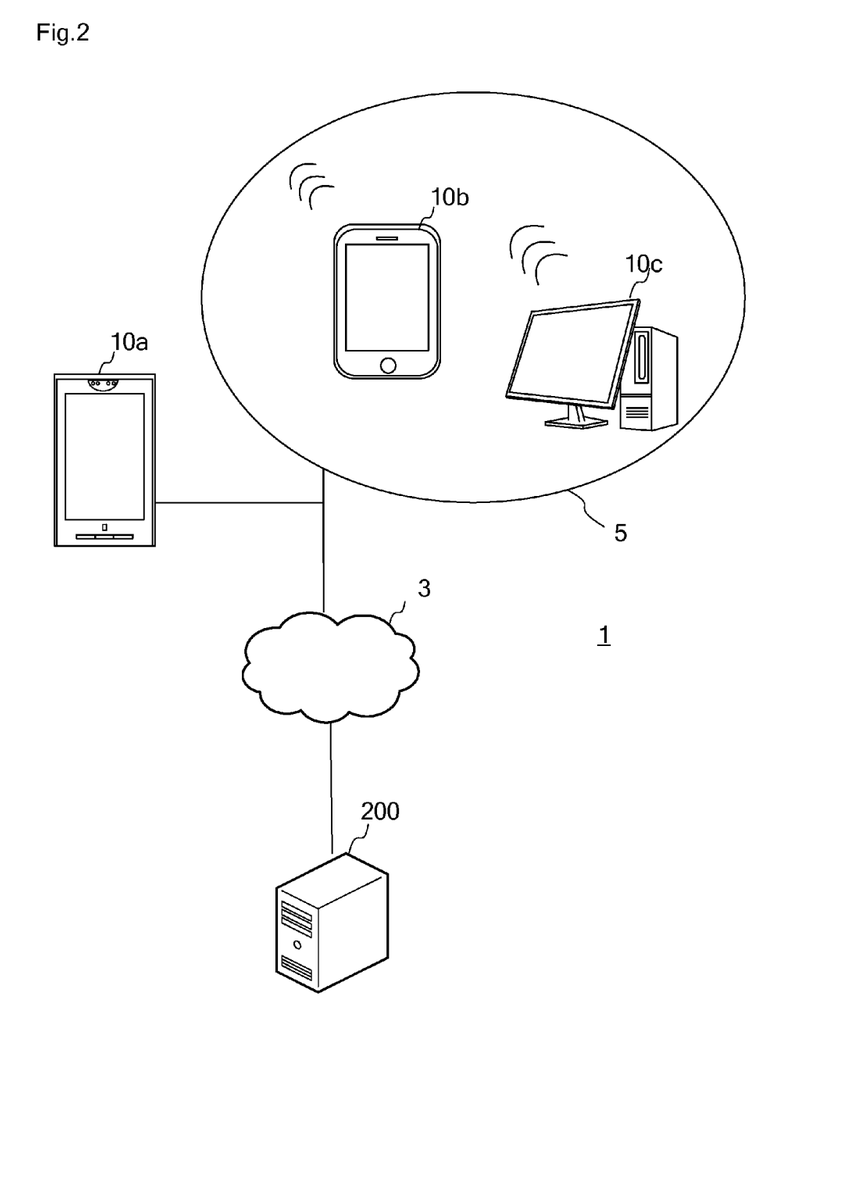
FIG. 2 is an overall schematic diagram of an example diagnostic handling system.

FIG. 2 shows the configuration of the diagnostic handling system 1. The diagnosis handling system 1 consists of two or more electric appliances 10*a*, 10*b*, and 10*c* (hereinafter referred to as "10" in the place of "10*a*, 10*b*, and 10*c*"), the diagnostic handling server 200, and the public network 3 such as the Internet. The diagnostic handling server 200 is communicatively connected with the electric appliance 10 through the public network 3. Like the electric appliances 10*b* and 10*c*, the electric appliance 10 may be communicatively connected with each other through a local area network 5. The local area network 5 may be communicatively connected with the public network 3, thereby allowing the electric appliances 10*b* and 10*c* to be connected with the diagnostic handling server 200.

The electric appliance 10 may be a general electric appliance that requires software or hardware configuration. The electric appliance 10 maybe an information technology device or an electric appliance provided with the functionality described below. For example, the electric appliance 10 may be a personal computer 10*c*, a mobile phone, a smart phone 10*a*, a slate terminal 10*b*, a complex printer, a television, network devices such as a router, a NAS, or a gateway, as well as a home electric appliance such as a refrigerator or a washing machine. The electric appliance 10 may also be a general information appliance such as a telephone, a netbook terminal, an electronic book terminal, an electronic dictionary terminal, a portable music player, or a portable player capable of recording and playing back contents.

Functions

Figure 3:
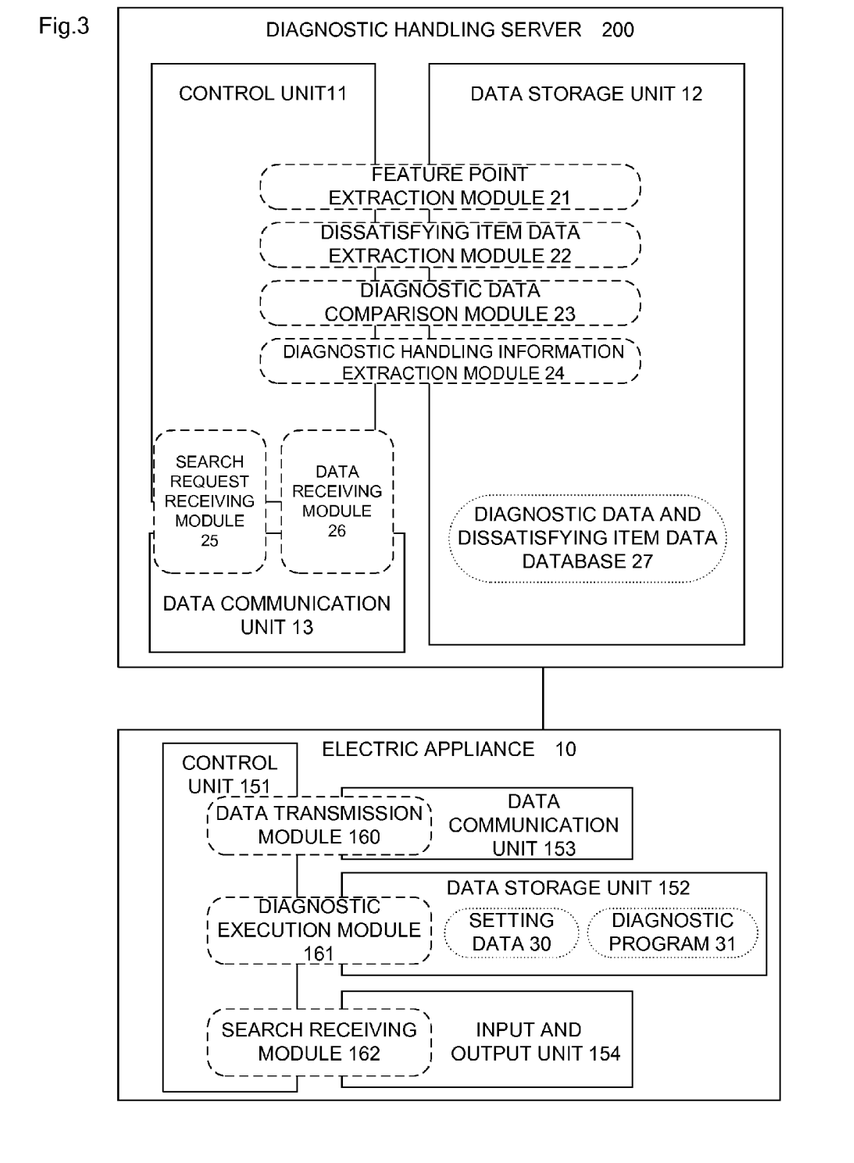
FIG. 3 is a functional block diagram of an example diagnostic handling server and the electric appliance.

The configuration of each device will be explained based on FIG. 3. The diagnostic handling server 200 may include a central processing unit (hereinafter referred to as "CPU"), random access memory (hereinafter referred to as "RAM"), and read only memory (hereinafter referred to as "ROM"), and the like as the control unit 11. The data communication unit 13 includes a device making it possible to communicate with other devices, for example a Wireless Fidelity® or WiFi® enabled device complying with IEEE 802.11. The diagnostic handling server 200 also includes a data storage unit such as a hard disk, semiconductor memory, a recording medium, or a memory card as a data storage unit 12 storing data and files. The data storage unit 12 includes the diagnostic data and dissatisfying item data database 27.

In the diagnostic handling server 200, the control unit 11 reads a predetermined program, cooperating with the data storage unit 12 to achieve the feature point extraction module 21, the dissatisfying item data extraction module 22, the diagnostic data comparison module 23, and the diagnostic handling information extraction module 24. Furthermore, in the diagnostic handling server 200, the control unit 11 reads a predetermined program, cooperating with the data communication unit 13 to achieve the search request receiving module 25 and the data receiving module 26.

Like the diagnostic server 200, the electric device 10 includes a central processing unit (hereinafter referred to as "CPU"), random access memory (hereinafter referred to as "RAM"), and read only memory (hereinafter referred to as "ROM"), and the like as the control unit 151. The data communication unit 153 includes a device making it possible to communicate with other electric appliances 10, for example a Wireless Fidelity® or WiFi® enabled device complying with IEEE 802.11 or a device achieving data communication through a fixed line.

The electric appliance 10 generally includes the input and output unit 154 provided with an output unit outputting and displaying data and images that are controlled by the control unit 151 and an input unit receiving input from a user. The input unit may be a general monitor, a keyboard, a mouse, and the like. The electric appliance 10 also includes a data storage unit 152 such as a hard disk, semiconductor memory, a recording medium, or a memory card for storing data and files.

The data storage unit 152 stores the setting data 30 to be diagnosed, for example, application setting data in which data on the application setting of the electric appliance 10 is described, communication setting data in which data on the communication setting of Wi-Fi® or the like is described, and operating system setting data in which data on the setting of the operating system is described. The data storage unit 152 may also store the diagnostic program 31 for generating the diagnostic data of the electric appliance 10.

In the electric appliance 10, the control unit 151 reads a predetermined program, cooperating with the data storage unit 152 to achieve the diagnostic execution module 161. Furthermore, in the electric appliance 10, the control unit 151 reads a predetermined program, cooperating with the data communication unit 153 to achieve the data transmission module 160. Furthermore, in the electric appliance 10, the control unit 151 reads a predetermined program, cooperating with the input and output unit 154 to achieve the search receiving module 162.

Feature Point Extraction Process

Figure 4:
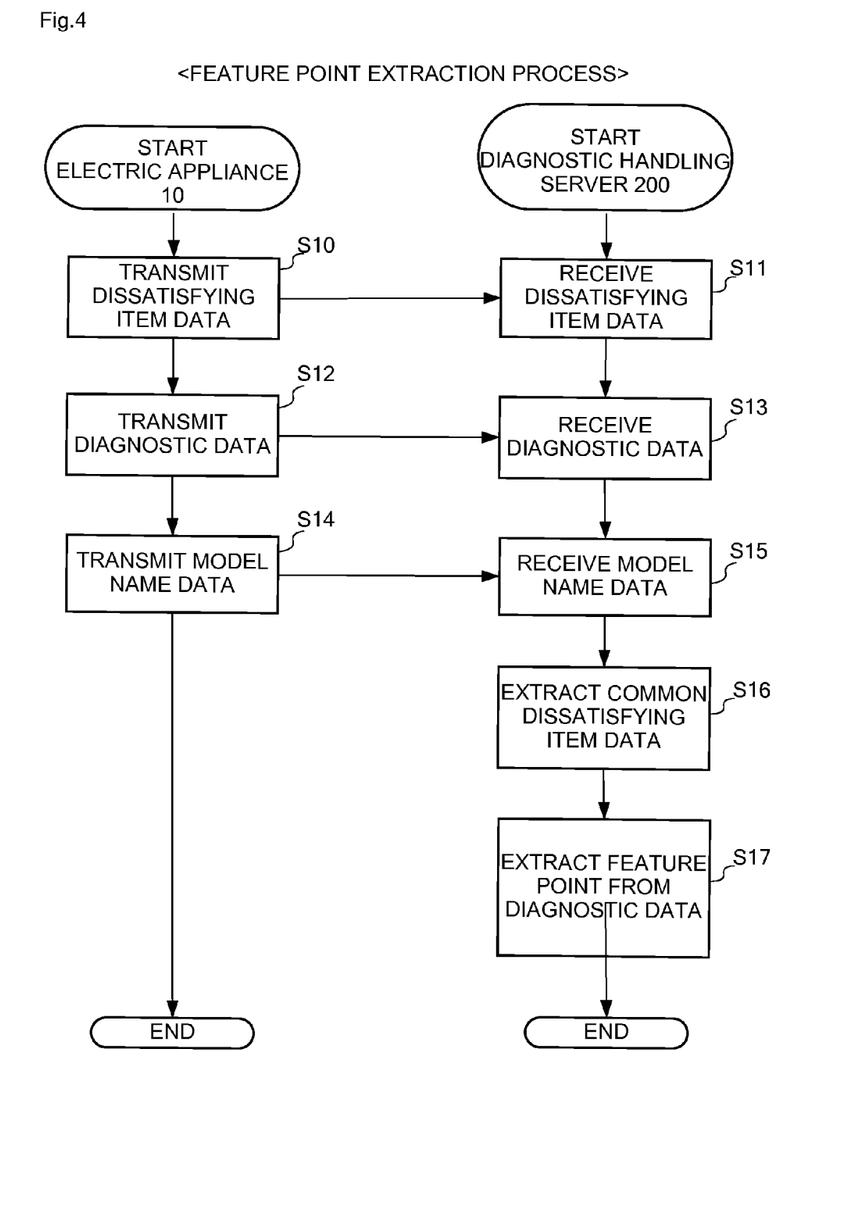
FIG. 4 is a flow chart illustrating an example feature point extraction process executed by the electric appliance and the diagnostic handling server.

FIG. 4 is a flow chart illustrating the feature point extraction process executed by the electric appliance 10 and the diagnostic handling server 200. The feature point extraction process is a process executed as the preprocessing of the diagnosis handling data transmission process described below in connection with FIG. 5.

The diagnostic execution module 161 of the electric appliance 10 preliminarily executes the diagnostic program 31 at a predetermined timing (for example, once a week) before executing the main process. The diagnostic program is a program to diagnose the electric appliance 10, which may be a program to check the setting data, the hardware load, and failure data. A result from the execution of the diagnostic program is output as diagnostic data.

In one example of the present embodiment, the diagnostic data, which is data on the installation diagnosis of an application, will be explained. In this case, the diagnostic data indicates which applications are installed on the electric appliance 10. The diagnostic data may describe not only the installation diagnosis of an application but also various diagnostic results such as power saving diagnosis, communication setting diagnosis, and hardware diagnosis.

The data transmission module 160 of the electric appliance 10 first transmits the dissatisfying item data to the diagnostic handling server 200 (Step S10). The data receiving module 26 of the diagnostic handling server 200 receives the dissatisfying item data received from the electric appliance 10 (Step S11), and stores it in the diagnostic data and dissatisfying item data database 27.

The dissatisfying item data is data on a matter (dissatisfying item) required for the diagnosis of the electric appliance 10 when a user who uses the electric appliance 10 perceives a failure or inconvenience of the electric appliance 10.

Figure 8:
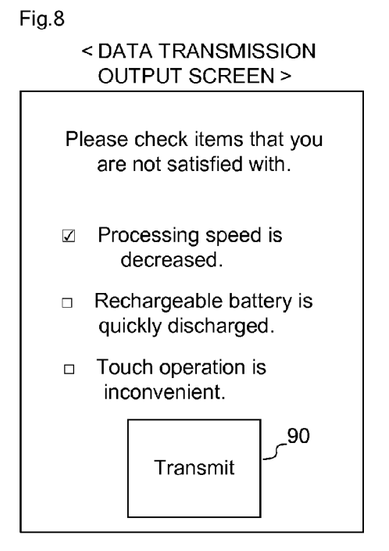
FIG. 8 is an example screen image of the data transmission output screen displayed on the electric appliance.

After starting a predetermined application (for example, a diagnosis application or the like) based on the operation from the user, the electric appliance 10 outputs a data transmission output screen such as shown in FIG. 8. The electric appliance 10 displays "Please check items that you are not satisfied with." The electric appliance 10 receives checks of the user's dissatisfying items, for example, "Processing speed is decreased," "Rechargeable battery is quickly discharged," and "Touch operation is inconvenient," and the like.

In the electric appliance 10, items checked by a user are preliminarily stored as the dissatisfying item data. The electric appliance 10 receives the input of the submit button 90 from the user after the user's checking, extracts dissatisfying item data corresponding to the checked item, and transmits the extracted dissatisfying item data to the diagnostic handling server 200.

The data transmission module 160 of the electric appliance 10 first transmits the diagnostic data output as an execution result of the diagnostic program 31 at the time of transmitting the dissatisfying item data, to the diagnostic handling server 200 (Step S12). The data receiving module 26 of the diagnostic handling server 200 receives the diagnostic data transmitted from the electric appliance 10, and stores it in the diagnostic data and dissatisfying item data database 27 (Step S13).

The data transmission module 160 of the electric appliance 10 then transmits the model name data of the electric appliance 10 to the diagnostic handling server 200 (Step S14). The data receiving module 26 of the diagnostic handling server 200 receives the model name data transmitted from the electric appliance 10, and stores it in the diagnostic data and dissatisfying item data database 27 in relation to the dissatisfying item data (Step S15).

The model name data is data on the model name and the manufacturer name of the electric appliance 10. The model name data may be preliminarily stored in the electric appliance 10. For example, a network device communicatively connected with the electric appliance 10 identifies the model name of the electric appliance 10 and allows the electric appliance 10 to store identified result data.

Figure 6:
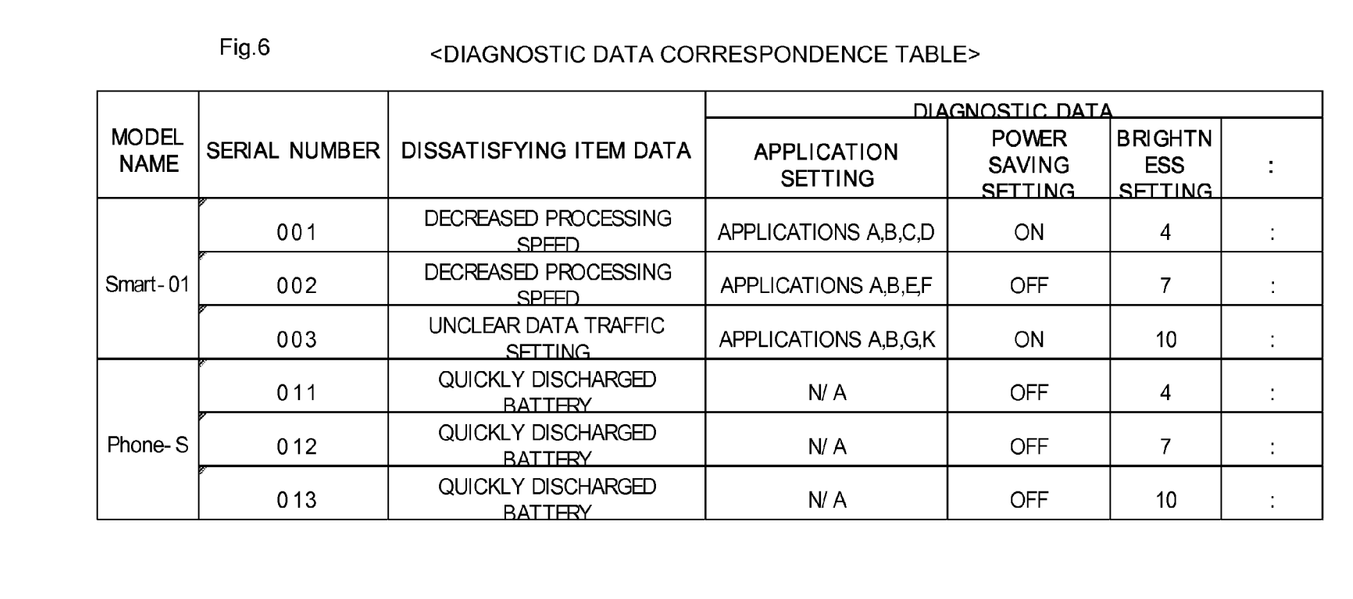
FIG. 6 is an example diagnostic data correspondence table stored in the diagnostic handling server.

The feature point extraction module 21 of the diagnostic handling server 200 associates and stores the model name data, the dissatisfying item data, and the diagnostic data in a diagnostic data correspondence table, such as depicted in FIG. 6.

It is desired that a number of electric appliances 10 execute the processes of the steps S10, S12, and S14. It is also desired that the diagnostic handling server 200 acquire and store a large amount of dissatisfying item data and diagnostic data in the diagnostic data and dissatisfying item data database 27. If this data is statistically insufficient, appropriate dissatisfying item data cannot be extracted on a search request in relation to a dissatisfying item from the electric appliance 10 as explained below.

The feature point extraction module 21 of the diagnostic handling server 200 then extracts common dissatisfying item data to organize the dissatisfying item data received from a plurality of electric appliances 10 (Step S16). For example, dissatisfying item data "decreased processing speed" is common in the serial numbers 001 and 002 of the electric appliance 10 as shown in FIG. 6. The dissatisfying item data "quickly discharged battery" is common in the serial numbers 011, 012, and 013 of the electric appliance 10. The feature point extraction module 21 extracts these common dissatisfying data and moves to the next process.

Figure 7:
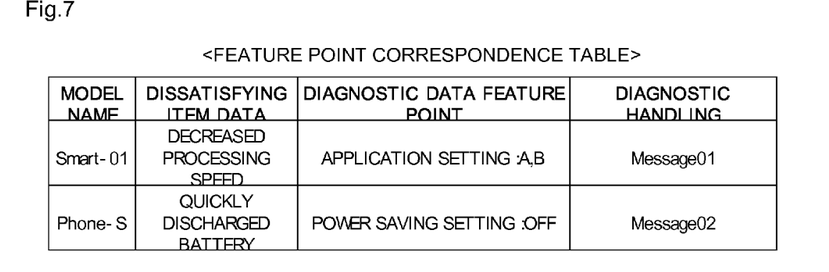
FIG. 7 is an example feature point corresponding table stored in the diagnostic handling server.

The feature point extraction module 21 then extracts diagnostic data from a plurality of dissatisfying item data extracted in common, and extracts the feature point from the diagnostic data (Step S17). The extraction of a feature point may be a process to extract what application is installed in common, or determine that a predetermined set value is the same or similar (approximate). The feature point extraction module 21 stores the extracted feature point in the feature point correspondence table, such as shown in FIG. 7.

In this case, the diagnostic data of serial numbers 001 and 002 are the installed applications A, B, C, and D, and the installed applications A, B, E, and F, respectively. Accordingly, the feature point "the applications A and B are installed." is extracted as the point. This feature point is then stored in the feature point correspondence table. The feature point correspondence table consists of model names respectively corresponding to dissatisfying item data, the feature points of diagnostic data, and diagnostic handling information.

Diagnosis Handling Data Transmission Process

Figure 5:
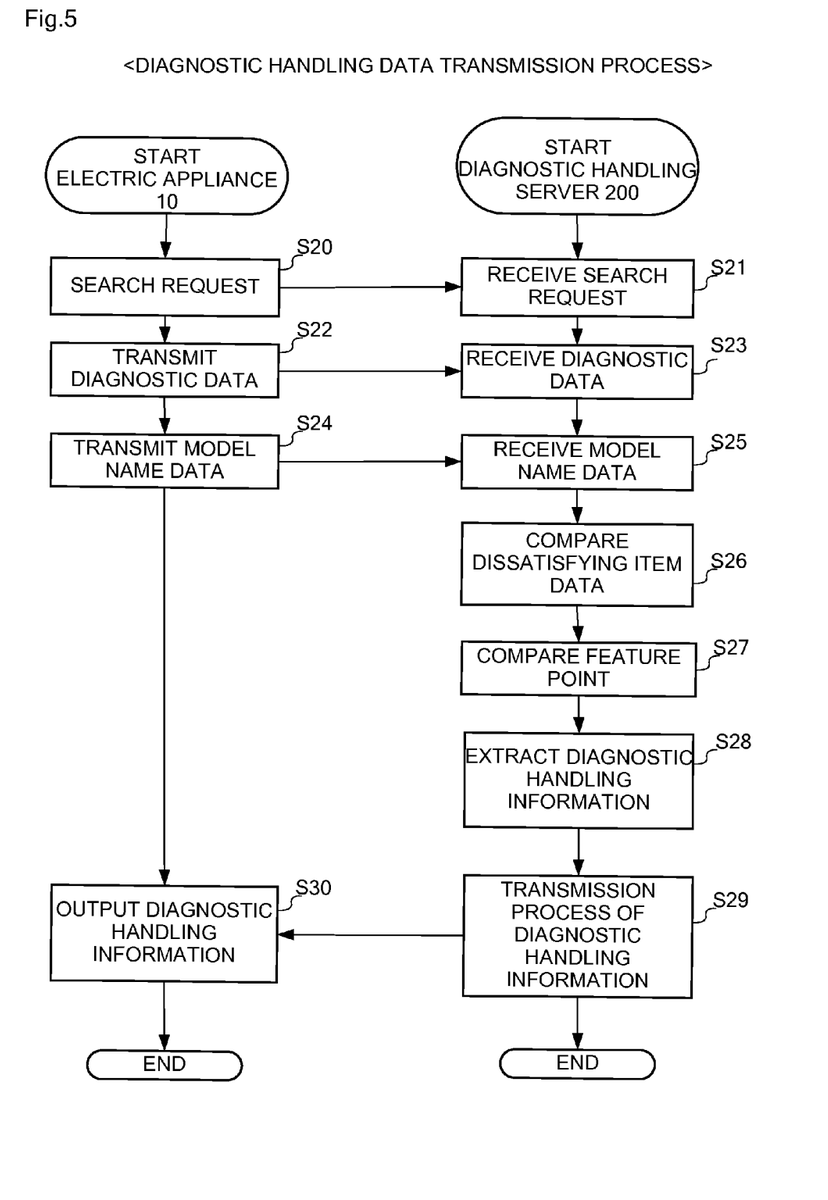
FIG. 5 is a flow chart illustrating an example diagnostic handling data transmission process executed by the electric appliance and the diagnostic handling server.

The diagnostic handling data transmission process executed by the electric appliance 10 and the diagnostic handling server 200 will be explained in connection with FIG. 5. The diagnosis handling data transmission process is executed after the above-mentioned feature point extraction process.

The search receiving module 162 of the electric appliance 10 receives a search request in relation to a predetermined dissatisfying item from a user (Step S20). In response to this, the search request receiving module 25 of the diagnostic handling server 200 receives a search request (Step S21).

Figure 9:
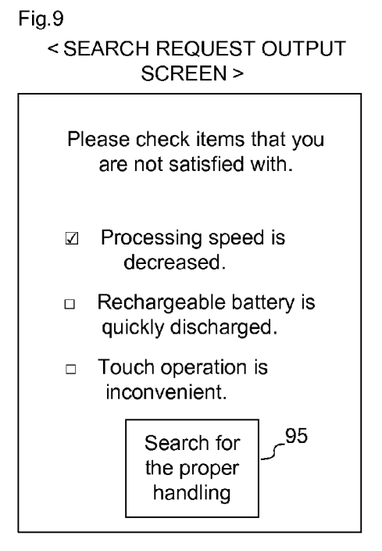
FIG. 9 is an example screen image of the search request output screen displayed on the electric appliance.

The search request is a request from a user to search for the solution to a matter (dissatisfying item) required for diagnosing or supporting the electric appliance 10. As one example, a search request output screen is displayed on the electric appliance 10, such as shown in FIG. 9. The electric appliance 10 displays "Please check items that you are not satisfied with" as a message. The electric appliance 10 receives checks of the user's dissatisfying items, for example, "Processing speed is decreased," "Rechargeable battery is quickly discharged," "Touch operation is inconvenient," and the like.

In the electric appliance 10, items checked by a user are preliminarily stored as the dissatisfying item data. The electric appliance 10 receives the input of the handling search button 95 from the user after the user checks an item, extracts dissatisfying item data corresponding to the checked item, and transmits the extracted dissatisfying item data to the diagnostic handling server 200.

The search request receiving module 25 of the diagnostic handling server 200 receives a search request as well as dissatisfying item data with the search request.

The search receiving module 162 of the electric appliance 10 then transmits the diagnostic data output as an execution result of the diagnostic program, to the diagnostic handling server 200 (Step S22). The search request receiving module 25 of the diagnostic handling server 200 receives the diagnostic data transmitted from the electric appliance 10 (Step S23) and stores it in relation to the dissatisfying item data.

The search receiving module 162 of the electric appliance 10 then transmits the model name data of the electric appliance 10 to the diagnostic handling server 200 (Step S24). The search request receiving module 25 of the diagnostic handling server 200 receives the model name data transmitted from the electric appliance 10 (Step S25) and stores it in relation to the dissatisfying item data.

The dissatisfying item data extraction module 22 of the diagnostic handling server 200 compares the dissatisfying item data from the search request to dissatisfying item data from the feature point correspondence table stored in the diagnostic data and dissatisfying item data database 27 (Step S26). The dissatisfying item data extraction module 22 extracts the same (or similar) dissatisfying item data as the dissatisfying item data with the search request. For example, when the dissatisfying item data corresponding to a search request is "decreased processing speed," the item of "decreased processing speed" in the feature point correspondence table is extracted.

The dissatisfying item data in the feature point corresponding table may be extracted based on the dissatisfying item data as well as the model name data received from the electric appliance 10. This increases the likelihood that diagnostic handling information corresponding to the dissatisfying item data is extracted as the diagnostic handling information required by a user.

The diagnostic data comparison module 23 of diagnostic handling server 200 then reads out the diagnostic data feature point corresponding to the extracted dissatisfying item data from the feature point corresponding table, and compares the read-out feature point with the diagnostic data received from the electric appliance 10 that has transmitted a search request (Step S27).

For example, the diagnostic data of the electric appliance 10 that has transmitted a search request indicates that "the applications A, B, E, and F are installed." With reference to the feature point corresponding table of FIG. 7, the feature point corresponding to the dissatisfying item "decreased processing speed" of the model name "Smart-01" is the point "the applications A and B are installed." By comparing this feature point with diagnostic data, it can be determined that the applications A and B are also installed in the electric appliance 10 that has transmitted a search request and the feature point is therefore common.

When the feature point is common, the diagnostic handling information extraction module 24 of the diagnostic handling server 200 refers to the feature point corresponding table to extract diagnostic handling information (Step S28), and transmits the extracted diagnostic handling information to the electric appliance 10 that has transmitted a search request.

In response to this, the search receiving module 162 of the electric appliance 10 that has transmitted the search request receives the diagnostic handling information transmitted from the diagnostic handling server 200, and outputs and displays it to the input and output unit 154 (Step S30).

The diagnostic handling information includes the cause and the proper handling of the dissatisfying item which a user who transmits a search request perceives. The diagnostic handling information is associated with dissatisfying item data in the feature point correspondence table. In FIG. 7, the diagnostic handling information is associated with the message data Message01 and Message02. A specific message text is described in each of these data. An administrator or the like of the diagnosis handling system 1, who recognizes the feature points, may input the specific message text.

Figure 10:
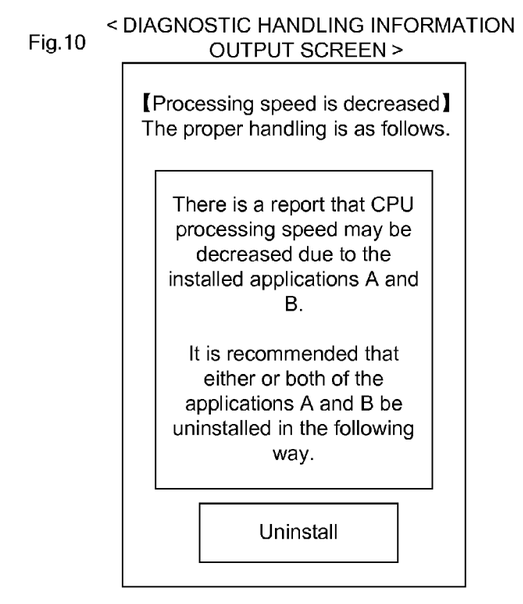
FIG. 10 is an example screen image of the diagnostic handling information output screen displayed on the electric appliance.

FIG. 10 shows diagnostic handling information displayed on the electric appliance 10. In FIG. 10, the message of diagnostic handling information for the dissatisfying item "decreased processing speed" is: "There is a report that CPU processing speed may be decreased due to the installed applications A and B. It is recommended that either or both of the applications A and B be uninstalled in the following way."

The diagnostic handling information may include not only a message to be displayed but also a program to execute the proper handling. Specifically, a handling program to execute the proper handling is executed after a message is displayed. Handling of a dissatisfying item may be executed in the electric appliance 10. In the above-mentioned example, the handling program to uninstall the applications A and B is executable.

The diagnostic handling information may also be link information (e.g., a URL) showing the place where a handling program is stored, or it may be a command to start a handling program preliminarily stored in the electric appliance 10.

To achieve the functionality as described above, a computer (including a CPU, an information processor, or various terminals) reads and executes a predetermined program. For example, a program is provided recorded on a computer-readable storage medium such as a floppy disk, a CD (CD-ROM etc.), or a DVD (a DVD-ROM and a DVD-RAM, etc.) or the like. In this case, a computer reads a program from the storage medium, forwards the program to internal or external storage to store the program therein, and executes the program. For example, the program may be preliminarily recorded in a memory device (storage medium) such as a magnetic disk, an optical disk, or a magnetic optical disk, and then provided from the memory device to a computer through a communication line.

The embodiments of the present invention are described above, but the present invention is not limited thereto. The effects described in the embodiments of the present invention are merely listed as the most suitable effects produced from the present invention. The effects of the present invention are not limited to those described in the embodiments of the present invention.

REFERENCE SIGNS LIST 1 diagnosis handling system
10 electric appliances
200 diagnostic handling server

I claim:

1. A diagnostic handling server communicatively connected with a plurality of electric appliances, the diagnostic handling server comprising memory and a processor configured to operate the following modules:
 a first storage module configured to receive, from the plurality of electric appliances, diagnostic data on a diagnosis item predetermined for each of the electric appliances and dissatisfying item data on a user's dissatisfaction with that electric appliance, and to store the diagnostic data in relation to the dissatisfying item data;
 a second storage module configured to extract common dissatisfying item data from the dissatisfying item data received from the plurality of electric appliances, and to extract and store a diagnostic data feature point corresponding to the extracted common dissatisfying item data;
 a receiving module configured to receive, from one electric appliance of the plurality of electrical appliances, a search request in relation to a specific dissatisfying item and diagnostic data of the one electric appliance;
 a first extraction module configured to compare, in response to the search request, the dissatisfying item from the search request to the dissatisfying item data, and to extract the same dissatisfying item data as the dissatisfying item from the search request;
 a comparison module configured to read out the diagnostic data feature point corresponding to the extracted dissatisfying item data and to compare the diagnostic data feature point with the diagnostic data of the one electric appliance; and
 a second extraction module configured to extract diagnostic handling information for the one electric appliance based on a comparison result;

wherein the specific dissatisfying item identifies poor performance of the one electric appliance during operation of a set of normally-running applications on the one electric appliance.

2. The diagnostic handling server according to claim 1, wherein the diagnostic handling information is information on a cause and handling of the dissatisfying item of the search request.

3. The diagnostic handling server according to claim 1, wherein the diagnostic handling information is a handling program in which one electric appliance handles itself.

4. The diagnostic handling server according to claim 1, wherein the diagnostic handling information is link information indicating a place where the handling program is stored.

5. The diagnostic handling server according to claim 1, wherein the diagnostic handling information is a command to start a handling program preliminarily stored in the one electric appliance.

6. The diagnostic handling server according to claim 1, further comprising:
a third storage module configured to receive, from the plurality of electric appliances, model names of the respective electric appliances, and to store the model name in relation to the dissatisfying item data, wherein:
the diagnostic data feature points are stored in relation to each of the respective model names;
from the one electric appliance, the model name of the one electric appliance is received in response to the search request; and
the second extraction module extracts the diagnostic handling information based on the model name in addition to a comparison result by the comparison module.

7. A handling diagnosis method executed by a diagnostic handling server communicatively connected with a plurality of electric appliances, the method comprising the steps of:
receiving, from the plurality of electric appliances, diagnostic data on a diagnosis item predetermined for each of the electric appliances and dissatisfying item data on a user's dissatisfaction with the electric appliances, and storing the diagnostic data in relation to the dissatisfying item data;
extracting common dissatisfying item data from the dissatisfying item data received from the plurality of electric appliances, and extracting and storing a diagnostic data feature point corresponding to the extracted common dissatisfying item data;
receiving, from one electric appliance, a search request in relation to a specific dissatisfying item and the diagnostic data of the one electric appliance;
comparing, in response to the search request, the dissatisfying item with the search request to the dissatisfying item data, and extracting the same dissatisfying item data as the dissatisfying item from the search request;
reading out the diagnostic data feature point corresponding to the extracted dissatisfying item data and comparing the diagnostic data feature point with the diagnostic data of the one electric appliance; and
extracting diagnostic handling information for the one electric appliance based on a comparison result;
wherein the specific dissatisfying item identifies poor performance of the one electric appliance during operation of a set of normally-running applications on the one electric appliance.

8. A computer program product for use in a diagnostic handling server communicatively connected with a plurality of electric appliances, comprising a non-transitory computer usable medium having a set of instructions physically embodied therein, the set of instructions including computer readable code, which when executed by the diagnostic handling server causes the diagnostic handling server to:
receive, from the plurality of electric appliances, diagnostic data on a diagnosis item predetermined for each of the electric appliances and dissatisfying item data on a user's dissatisfaction with the electric appliances, and storing the diagnostic data in relation to the dissatisfying item data;
extract common dissatisfying item data from the dissatisfying item data received from the plurality of electric appliances, and extracting and storing a diagnostic data feature point corresponding to the extracted common dissatisfying item data;
receive, from one electric appliance, a search request in relation to a specific dissatisfying item and the diagnostic data of the one electric appliance;
compare, in response to the search request, the dissatisfying item with the search request to the dissatisfying item data, and extract the same dissatisfying item data as the dissatisfying item from the search request;
to read out the diagnostic data feature point corresponding to the extracted dissatisfying item data and compare the diagnostic data feature point with the diagnostic data of the one electric appliance; and
extract diagnostic handling information for the one electric appliance based on a comparison result;
wherein the specific dissatisfying item identifies poor performance of the one electric appliance during operation of a set of normally-running applications on the one electric appliance.

9. The handling diagnosis method according to claim 7, wherein receiving, from the one electric appliance, the search request in relation to the specific dissatisfying item includes receiving the search request in response to:
the electric appliance having displayed a plurality of potential dissatisfying items pre-selected for that electric appliance; and
the user having selected the specific dissatisfying item from the displayed plurality of potential dissatisfying items in response to having noticed the poor performance of the one electric appliance.

10. The handling diagnosis method according to claim 9, wherein the plurality of potential dissatisfying items pre-selected for that electric appliance includes:
a speed of that electric appliance being unsatisfactory; and
a battery life of that electric appliance being unsatisfactory.

11. The handling diagnosis method according to claim 7, wherein:
storing the diagnostic data feature point corresponding to the extracted common dissatisfying item data includes storing the diagnostic data feature point in a feature point correspondence table in conjunction with diagnostic handling information, the diagnostic handling information describing a corrective action for the user to take to improve poor performance identified by a dissatisfying item of the extracted common dissatisfying item data; and
the method further comprises sending the extracted diagnostic handling information to the one electric appliance to advise the user of the corrective action relating to the specific dissatisfying item.

12. The handling diagnosis method according to claim 11, wherein the corrective action relating to the specific dissatisfying item includes modifying a system setting of that electric device.

* * * * *